May 7, 1963 B. ROSS 3,089,037

VARIABLE DELAY PULSE STRETCHER USING ADJUSTABLE BIAS

Filed March 17, 1959

INVENTOR.
BERND ROSS
BY [signature]
ATTORNEY

United States Patent Office 3,089,037

Patented May 7, 1963

3,089,037

VARIABLE DELAY PULSE STRETCHER USING ADJUSTABLE BIAS

Bernd Ross, Lexington, Ky., assignor to Hoffman Electronics Corporation, a corporation of California Filed Mar. 17, 1959, Ser. No. 799,977
4 Claims. (Cl. 307—88.5)

The present invention relates to pulse stretchers, and more particularly to semiconductor variable lifetime and variable minority-carrier recovery time devices.

In a semiconductor, when an electron is separated from a hole, the electron may eventually be reunited with the hole either by direct recombination or by recombination through an intermediate trapping state. The statistical chance of a moving electron getting within absorption range of a moving hole, as is required for direct recombination, is sufficiently small to permit the ignoring of direct recombination for the purposes of the present invention. Thus, the recombination must depend upon trapping states. There are two trapping possibilities. One possibility is that electron traps into which electrons can fall are present in the semiconductor. An electron is immobilized while it is in the trap, and if during that time a hole comes within range, the immobile electron falls into the hole and recombines. The other possibility is that hole traps with energy below the Fermi level are present in the semiconductor. Such hole traps are almost always filled with electrons and they have electrons available to recombine with, or trap, holes. In the process the hole trap loses an electron, enabling an electron to fall into the trap, thereby eliminating the original hole-electron pair.

The lifetime of minority carriers in a semiconductor depends upon the availability of unoccupied traps. A finite time interval is required for an occupied trap to emit the trapped minority carrier, and, thus, each trap becomes unavailable, or saturated, upon acquiring a minority carrier, and remains so until the minority carrier is emitted. A device that can vary the lifetime of minority carriers by controlling trap saturation is very desirable for use as a variable delay.

It is an object of the present invention, therefore, to provide a novel semiconductor variable delay device or pulse stretcher.

It is another object of the present invention to provide a semiconductor device for varying the lifetime of minority carriers by controlling trap saturation.

According to the present invention, a pulse stretcher comprises a semiconductor having two p-n junctions separated by a body portion, or base. The junction nearest the base contact is biased in the forward direction so as to modulate the trap saturation in the base region by regulation of the amount of bias current. The input pulse that is to be widened is applied to the other junction.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, FIGURE 1 is a perspective view of a semiconductor according to the present invention.

Figure 1:
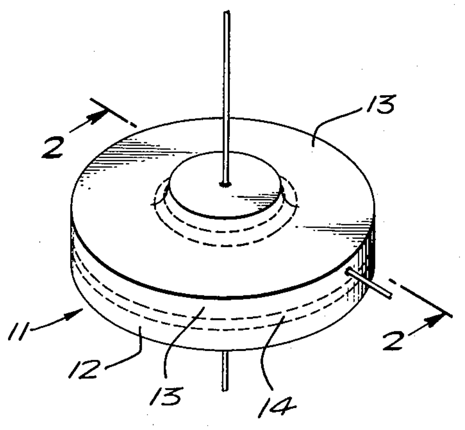

Referring now to the drawings, FIGURE 1 shows semiconductor 11 having p-type regions 12 and 13 and n-type region 14. If desired, the conductivity types may be reversed.

Figures 2, 3:
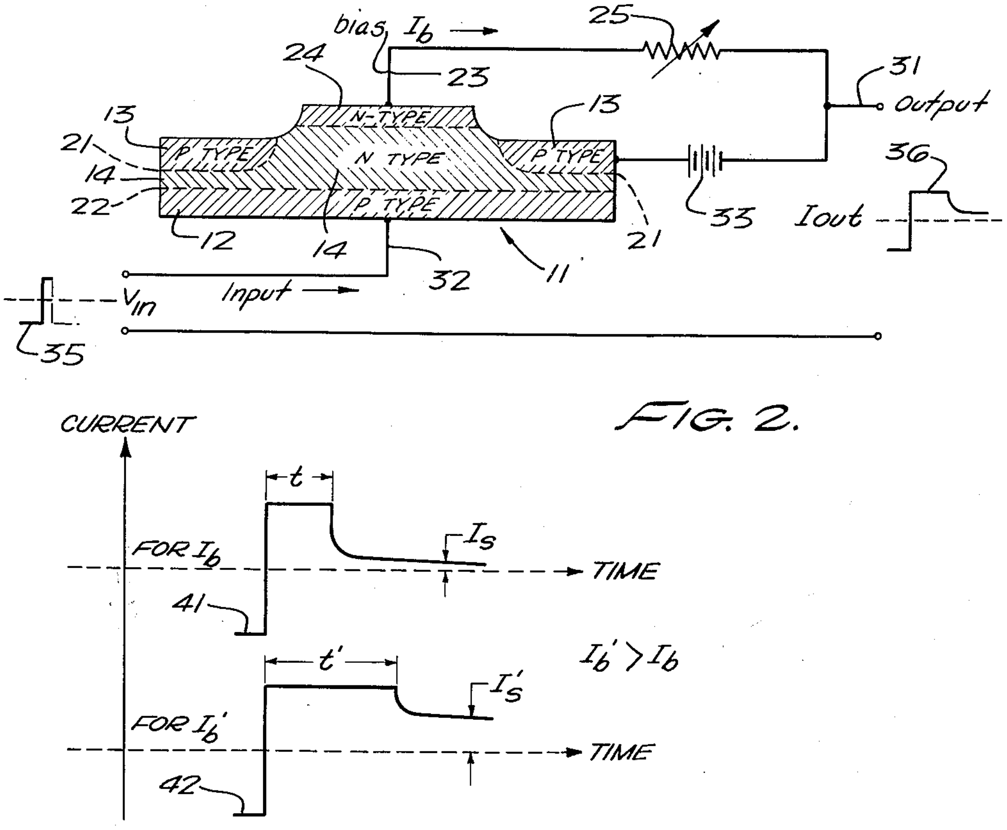
FIGURE 2 is a sectional view taken along line 2—2 of FIGURE 1, with an external circuit added to show a pulse stretcher according to the present invention.
FIGURE 3 shows a graph of two output currents obtainable from the circuit of FIGURE 2.

FIGURE 2 shows junction 21 of semiconductor 11 in the region between p-type region 13 and n-type region 14, and junction 22 in the region between n-type region 14 and p-type region 12. Junctions 21 and 22 are disposed within a minority carrier diffusion length of each other. Bias lead 23 makes ohmic contact with n-type region 14 through n-type region 24, which was made degenerate by heavy diffusion with phosphorus until it became metallic in behavior. Degeneration is necessary because of the relatively high resistivity of bases. Lead 23 is connected to one end of variable resistor 25, the other end of which is connected to output lead 31. P-type region 12 is ohmically connected to input lead 32, and p-type region 13 is ohmically connected to output lead 31 through bias battery 33, which biases junction 21 in the forward direction. The relationship between input voltage waveform 35, applied to input lead 32, and output current waveform 36, received at output lead 31, will now be explained.

FIGURE 3 shows current waveforms 41 and 42 compared as to durations $t$ and $t'$, respectively, and saturation currents $I_s$ and $I_s'$, respectively. Waveform 41 is obtained when a first bias is applied to semiconductor 11 through resistor 25, and waveform 42 is obtained when a second bias is applied to semiconductor 11 through resistor 25, the second bias being greater than the first bias. From FIGURE 3 it can be seen that the pulse duration and saturation current are proportional to the bias. When the bias current is increased from a value of $I_b$ to that of $I_b'$, the pulse duration or width will be increased proportionately from a value of $t$ to $t'$, and the saturation current will be increased proportionately from a valve of $I_s$ to $I_s'$. This demonstrates how a variable bias can be used to vary the availability of unoccupied traps, thereby controlling the lifetime of minority carriers and the delay of the device.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A pulse stretcher comprising a semiconductor body having first, second, and third regions, said second and third regions being located at least in part on opposite sides of said semiconductor body, said first region being of a first conductivity type, said second and third regions being of a second conductivity type, said first and second regions being contiguous and separated by a first P-N junction, and said first and third regions being contiguous and separated by a second P-N junction, an input lead ohmically connected to said third region, a variable bias supply coupled to said first and second regions for biasing said first P-N junction in the forward direction and modulating the trap saturation in said first region, and an output lead coupled to said first region.

2. The apparatus as set forth in claim 1, in which said first and second P-N junctions are located within a minority carrier diffusion length of each other.

3. The apparatus as set forth in claim 1, in which said first region extends partly through said second region, and said first region is diffused into said second region along the boundaries of said extension.

4. A pulse stretcher comprising a semiconductor body having first, second, and third regions, said second and third regions being located at least in part on opposite sides of said semiconductor body, said first region being of a first conductivity type, said second and third regions being of a second conductivity type, said first and second regions being contiguous and separated by a first P-N junction, said first and third regions being contiguous and separated by a second P-N junction, said first and second P-N junctions being located at least in part within a minority carrier diffusion length of each other, said second region being ring-shaped so as to expose said first region through the center thereof, a first lead ohmically connected to said first region through the center of said ring-shaped second region, second and third leads ohmically connected to said second and third regions respectively, and a variable bias supply coupled to said first and second leads for biasing said first P-N junction in the forward direction and modulating the trap saturation in said first region, said third lead constituting an input connection for pulse signals, and said first and third leads together forming an output connection.

References Cited in the file of this patent

UNITED STATES PATENTS

| | | |
|---|---|---|
| 2,600,500 | Haynes et al. | June 17, 1952 |
| 2,672,528 | Shockley | Mar. 16, 1954 |
| 2,681,993 | Shockley | June 22, 1954 |
| 2,717,342 | Pfann | Sept. 6, 1955 |
| 2,814,735 | Cady et al. | Nov. 26, 1957 |
| 2,905,836 | Herold | Sept. 22, 1959 |